(12) United States Patent
Ryu et al.

(10) Patent No.: US 6,853,507 B2
(45) Date of Patent: Feb. 8, 2005

(54) LENS DRIVING DEVICE

(75) Inventors: Jung Ho Ryu, Suwon (KR); Dae Hyun Jeong, Suwon (KR); Oui Serg Kim, Seoul (KR); Byung Woo Kang, Seoul (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/732,298

(22) Filed: Dec. 11, 2003

(65) Prior Publication Data

US 2005/0007683 A1 Jan. 13, 2005

(30) Foreign Application Priority Data

Jul. 9, 2003 (KR) .................. 10-2003-0046496

(51) Int. Cl.[7] ........................... G02B 15/14; G02B 7/02
(52) U.S. Cl. .................. 359/824; 359/696; 359/823
(58) Field of Search ................ 359/823, 824, 359/694, 696

(56) References Cited

U.S. PATENT DOCUMENTS 6,078,438 A * 6/2000 Shibata et al. .............. 359/819
6,215,605 B1 4/2001 Kuwana et al.
6,268,970 B1 7/2001 Ito et al.

* cited by examiner

Primary Examiner—Hung Xuan Dang
Assistant Examiner—Joseph Martinez
(74) Attorney, Agent, or Firm—Lowe Hauptman Gilman & Berner, LLP

(57) ABSTRACT

The present invention relates to a lens driving device, more particularly, capable of adjusting an effective focal length determined by the relative distance of lenses in an optical device having a zooming function. In the lens driving device, a barrel unit has an internal space for containing a lens therein and a guide slot for allowing forward and backward movement of the lens through rotation of the barrel unit. A ring-shaped piezoelectric actuator unit is arranged adjacent to the barrel unit for being contracted or expanded radially in response to an external input signal. A drive member is mounted on the piezoelectric actuator unit and having a plurality of segments projected toward the barrel unit to contact the same.

32 Claims, 13 Drawing Sheets

US 6,853,507 B2

LENS DRIVING DEVICE

PRIORITY

Cross-Reference to Related Application This application claims to benefit of Korea Patent No. 2003-046496, filed Jul. 9, 2003, in the Korean Intellectual Property Office, the disclosure of which is incorporated herein by reference.

BACKGROUND OF THE INVENTION

1. Field of the Invention

The present invention relates to a lens driving device, more particularly, capable of adjusting an effective focal length determined by the relative distance of lenses in an optical device having a zooming function.

2. Description of the Related Art

Various optical instruments such as a camera, a camcorder, a zoom camera, an observation camera and an optics in a Micro Air Vehicle (MAV) have a driving structure for enabling forward and backward movement of a lens for zooming. There have been developed several structures for transporting the lens for such zooming.

A conventional driving technique based upon a cam structure has been used for zooming to adjust a focal length. The cam structure-based driving technique executes zooming by varying the relative spacing between lenses along a lens barrel, which is driven by an electromagnetic motor, and a cam-shaped groove placed in a lateral portion of the lens barrel.

FIG. 1 illustrates a conventional lens driving mechanism which is disclosed in U.S. Pat. Ser. No. 6, 268, 970, entitled "Zoom Lens Barrel." In FIG. 1, lens groups 120, 130 and 140 are supported by frames which are in turn supported by cam tubes 160 and 170. The cam tubes are driven by a plunger 110 to shift a lens axially.

The cam structure-based zooming technique determines the relative position of each lens according to the configuration of a cam. Therefore, there are drawbacks in that this technique further requires a driving unit and a focusing lens for setting a focus at a specific magnification as well as complicates a driving mechanism including a driven reduction gear and a lens holding structure which moves along the cam.

FIG. 2 illustrates a conventional zoom lens mechanism of a camera which is disclosed in Korean Laid-Open Patent Publication Serial No. 2000-55180. The zoom lens mechanism comprises a camera body 200 and a stationary lens group 201 including a plurality of lenses. Within the camera body 200, there is provided a space for receiving a zoom motor 203. The zoom motor 203 has a shaft coupled with a lead screw 205 which has threads and grooves formed in the outer periphery thereof. A clip 207 for transmitting power is coupled with the outer periphery of the lead screw 205. The clip 207 is also provided with threads and grooves in a portion thereof contacted with the lead screw 205, in which the threads and grooves are shaped equal to the those of the lead screw 205 to mesh with the same. The clip 207 is also coupled with a zoom barrel 209 which is in turn coupled with a movable lens group 202. The zoom barrel 209 is coupled slidably with a guide shaft 211 which is oriented along an optical axis so that the zoom barrel 209 can be moved in a direction of the optical axis along with the guide shaft 211.

In the zoom lens mechanism of the above camera, rotation of the motor 203 also causes the lead screw 250 to rotate along with the motor 203. Then, rotation of the lead screw 205 is translated into linear motion via the clip 207 so that the clip 207 moves linearly along the optical axis. As the clip 207 performs linearmovement, the zoom barrel 209 in turn moves along the optical axis. When the zoom barrel 209 moves along the optical axis, a portion of the zoom barrel 209 in contact with the guide shaft 211 performs sliding motion so that the zoom barrel 209 can perform forward and backward movement along the optical axis in a predetermined range.

However, the conventional zoom lens mechanism has a problem of electromagnetic wave since the motor is driven by electromagnetic power. As a result, this mechanism is rarely applicable to small-sized communication devices. Further, the electromagnetic motor uses a final reduction gear thereby making a mechanical structure complicated. Moreover, the zoom lens and the focus lens must be moved separately in order to be focused.

Recently, there is developed a micro-optical zoom mechanism in order to overcome the above drawbacks as well as to impart a zooming function to a micro optical instrument. According to the current trend, the micro optical instrument employs an intelligent device such as a piezoelectric element rather than the conventional driving technique using the electro magnetic motor. Substituting the piezoelectric element for the conventional motor driving technique has advantages that a driving structure can be simplified and high efficiency can be realized owing to a direct drive mechanism.

FIG. 3 shows an example of a zoom lens driving device using such a piezoelectric element which is disclosed in U.S. Pat. No. 6,215,605, entitled "Driving Device." The lens driving device in FIG. 3 has piezoelectric actuators 311 and 312 fixed to base blocks 321 and 322, and transfers displacement to driving rods 316 and 317 so as to transport lenses L2 and L4 under effects of the preload from projections 331a and 332a together with inertia and acceleration of lens holders 331 and 332. The piezoelectric actuator 312, according to the waveform of exciting input, transports the lens by enabling the lens holder to move together with the driving rod or to slide and stay in position. The piezoelectric actuator 312 can also transport the lens in forward and backward directions.

The lens driving device shown in FIG. 3 is arranged in use as shown in FIG. 4, in which the piezoelectric actuators 311a and 311b are arranged adjacent to each other. So, when a base block 313 receives any expansion/compression transferred from one of the piezoelectric actuators 311a and 311b, this expansion/compression may be also transferred to the other one of the piezoelectric actuators and thus its corresponding lens. Therefore, the base block dl3 is provided with a groove dl3g in order to block transfer of the expansion/compression between the piezoelectric actuators. However, the groove complicates the structure of the driving device while causing fabrication of the driving device difficult. Furthermore, the groove cannot block the expansion/compression interference between the piezoelectric actuators completely.

Further, the length of the driving rods 316 and 316, which are reciprocated by the piezoelectric actuators to transport the lenses, is largely restricted according to the size of the piezoelectric actuators. Such restriction to the length of the driving rods acts as limitation to the transportable distance of the lens and thus disadvantageously affects qualities of a product incorporating the lens driving device.

Because the driving rods are essentially fixed, the conventional lens driving device has following problems: It is impossible to vary the length of the lens barrel on which the lenses are internally mounted. In addition to a space used for transport of the lens, an additional space for arranging driving elements is required. As a result, the overall size of the driving device is rarely reduced. Furthermore, the lens is partially supported by the driving rod so that asymmetric expansion/contraction may occur in the lens during actuation, thereby potentially making the lens driving operation unstable.

SUMMARY OF THE INVENTION

The present invention has been made to solve the foregoing problems and it is therefore an object of the present invention to provide a lens driving device capable of simplifying a structure of a lens driving unit and thus reducing the size of a zoom lens unit.

It is another object of the invention to provide a lens driving device which uses a piezoelectric actuator to rotate a zoom lens barrel in order to omit mechanical gear devices, remove noises and electromagnetic waves, obtain high drive efficiency, and minimize power loss.

It is further another object of the invention to provide a lens driving device incorporating a lens transport mechanism which ensures that a lens feed length is not influenced by other components.

It is other object of the invention to provide a lens driving device capable of imparting ultra precision control to the position of the lens to adjust both focal length and magnification minutely and to obtain high resolution.

Further, it is yet another object of the invention to provide a lens driving device which can be applied to various forms of driving devices for ultra small optical zoom units in use for a camera, a camcorder, an observation camera and a Micro Air Vehicle (MAV).

According to an aspect of the invention for realizing the object, there is provided a lens driving device comprising: a barrel unit having an internal space for containing a lens therein and a guide slot for allowing forward and backward movement of the lens through rotation of the barrel unit; a ring-shaped piezoelectric actuator unit arranged adjacent to the barrel unit for being contracted or expanded radially in response to an external input signal; and a drive member mounted on the piezoelectric actuator unit and having a plurality of segments projected toward the barrel unit to contact the same.

It is preferred that the barrel unit includes a stationary barrel having a guide slot formed linearly in forward and backward directions and a rotary barrel having a guide slot in the form of a cam curve.

It is preferred that the rotary barrel is rotated by the piezoelectric actuator unit. It is also preferred that the piezoelectric actuator unit includes a first piezoelectric actuator for rotating the rotary barrel clockwise and a second piezoelectric actuator for rotating the rotary barrel counterclockwise.

The driving device of the invention may further comprise a one-way clutch mounted on the rotary barrel for transmitting one-way rotation to the rotary barrel, wherein the one-way clutch bearing is contacted by the segments.

It is preferred that the segments of the drive member mounted on the first piezoelectric actuator are oriented clockwise to contact the one-way clutch bearing, and the segments of the drive member mounted on the second piezoelectric actuator are oriented counterclockwise to contact the one-way clutch bearing.

It is also preferred that the segments of the drive member mounted on the first piezoelectric actuator are oriented clockwise to contact the rotary barrel, and the segments of the drive member mounted on the second piezoelectric actuator are oriented counterclockwise to contact the rotary barrel.

It is preferred that the first and second piezoelectric actuators are placed outside the rotary barrel or inside the rotary barrel. Alternatively, the first piezoelectric actuator may be placed outside the rotary barrel, and the second piezoelectric actuator may placed inside the rotary barrel.

It is also preferred that the piezoelectric actuator has a laminated structure or a single plate structure. The driving device of the invention may further comprise a ring-shaped transformer mounted adjacent to the barrel unit for supplying amplified voltage to the piezoelectric actuator of the single plate structure.

It is preferred that the lens has a boss fixed to an outer peripheral portion of the lens, the boss being inserted into the guide slot of the barrel unit to movably place the lens within the barrel unit.

According to another aspect of the invention for realizing the object, there is provided a lens driving device comprising: a stationary barrel having an internal space for containing a lens and a linear guide slot formed in forward and backward directions for allowing forward and backward movement of the lens; a rotary barrel arranged surrounding the stationary barrel and having a cam-shaped guide slot; a pair of ring-shaped piezoelectric actuators arranged surrounding an outer peripheral portion of the rotary barrel for contracting and expanding radially in response to an external input signal; a pair of one-way clutch bearings mounted on the outer peripheral portion of the rotary barrel for transmitting rotation in one direction; and a pair of ring-shaped drive members mounted respectively on inner peripheral portions of the piezoelectric actuators, actuators, the drive members having clockwise segments and counterclockwise segments projected inward to contact the one-way clutch bearings.

It is preferred that the piezoelectric actuators have a laminated structure or a single plate structure. The driving device of the invention may further comprise a ring-shaped transformer mounted adjacent to the barrel unit for supplying amplified voltage to the piezoelectric actuators of the single plate structure.

It is also preferred that the lens has a boss fixed to an outer peripheral portion of the lens, the boss being inserted into the guide slots of the barrels to movably place the lens within the barrels. The driving device of the invention may further comprise a lens frame having a boss projected from an outer peripheral portion of the lens frame, wherein the boss being inserted into the guide slots of the barrels to movably place the lens within the barrels.

According to further another aspect of the invention for realizing the object, there is provided a lens driving device comprising: a lens driving device comprising: a stationary barrel having an internal space for containing a lens and a linear guide slot formed in forward and backward directions for allowing forward and backward movement of the lens; a rotary barrel arranged surrounding the stationary barrel and having a cam-shaped guide slot; a pair of ring-shaped piezoelectric actuators arranged within the rotary barrel for expanding and contracting radially in response to an external input signal; a pair of one-way clutch bearings mounted on an inner peripheral portion of the rotary barrel for transmitting rotation in one direction; and a pair of ring-shaped drive members mounted respectively on outer peripheral portions of the piezoelectric actuators, the drive members having clockwise segments and counterclockwise segments projected inward to contact the one-way clutch bearings.

It is preferred that the piezoelectric actuators have a laminated structure or a single plate structure. The driving device of the invention may further comprise a ring-shaped transformer mounted adjacent to the barrel unit for supplying amplified voltage to the piezoelectric actuators of the single plate structure.

It is also preferred that the lens has a boss fixed to an outer peripheral portion of the lens, the boss being inserted into the guide slots of the barrels to movably place the lens within the barrels. The driving device of the invention may further comprise a lens frame having a boss projected from an outer peripheral portion of the lens frame, wherein the boss being inserted into the guide slots of the barrels to movably place the lens within the barrels.

According to yet another aspect of the invention for realizing the object, there is provided a lens driving device comprising: a stationary barrel having an internal space for containing a lens and a linear guide slot formed in forward and backward directions for allowing forward and backward movement of the lens; a rotary barrel arranged surrounding the stationary barrel and having a cam-shaped guide slot; a ring-shaped piezoelectric actuator arranged within the rotary barrel for expanding radially and restoring to an original position in response to an external input signal; a ring-shaped piezoelectric actuator arranged surrounding an outer peripheral portion of the rotary barrel for contracting radially and restoring to an original position in response to an external input signal; a pair of one-way clutch bearings mounted on outer and inner peripheral portions of the rotary barrel for transmitting rotation in one direction; and a pair of ring-shaped drive members mounted respectively on outer peripheral portions of the piezoelectric actuators, the drive members having clockwise segments and counterclockwise segments projected inward to contact the one-way clutch bearings.

It is preferred that the piezoelectric actuators have a laminated structure or a single plate structure. The driving device of the invention may further comprise a ring-shaped transformer mounted adjacent to the barrel unit for supplying amplified voltage to the piezoelectric actuators of the single plate structure.

It is also preferred that the lens has a boss fixed to an outer peripheral portion of the lens, the boss being inserted into the guide slots of the barrels to movably place the lens within the barrels. The driving device of the invention may further comprise a lens frame having a boss projected from an outer peripheral portion of the lens frame, wherein the boss being inserted into the guide slots of the barrels to movably place the lens within the barrels.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following detailed description will describe preferred embodiments of the invention in reference to the accompanying drawings.

Zooming Function

The present invention relates to a structure for imparting a zooming function to an optical device such as a camera. With the zooming function, the optical device can photograph a remote object as if it is positioned near. That is, the zooming function enables the optical device to photograph an enlarged image of the object. The zooming function generally includes zoom-in and zoom-out functions. The zoom-in function enlarges a remote object to be photographed as if it is positioned near, whereas the zoom-out function expands a photographing range to surroundings of an adjacent object so that the object is photographed as if it is positioned farther.

The zooming function may be also divided into optical and digital zooming functions. The optical zooming function executed according to variation of the spacing between lenses is advantageous since it can complement an image sensor of low resolution without degrading image quality. Whereas, the digital zooming function can advantageously impart high exposure to a specific region of an image while image quality is more or less degraded. The digital zooming function is a software-based technique such as for amplifying an image signal detected by an image device.

Figure 5:
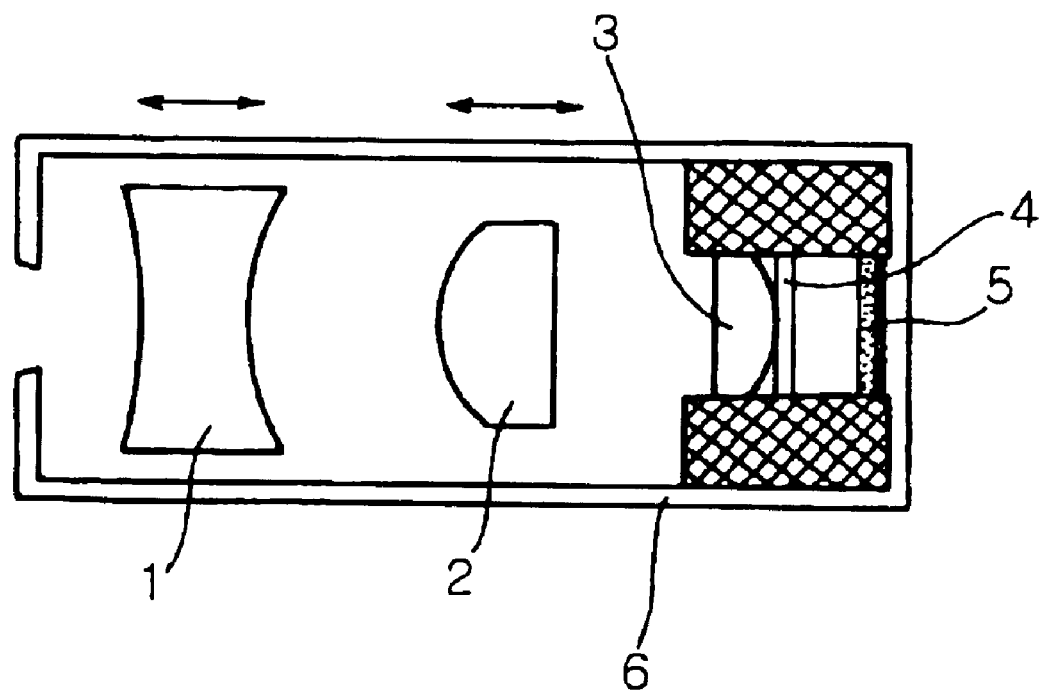
FIG. 5 is a sectional view of a lens barrel structure having a zooming function.

FIG. 5 is a sectional view of a typical zoom mechanism for performing a zooming function. In FIG. 5, the zoom mechanism comprises a focus lens 1 and a zoom lens 2 which are arranged within a cylindrical barrel 6 in a manner movable forward and backward. The zoom mechanism also comprises a dummy lens 3, a filter 4 and an image device 5 such as a Charge Coupled Device (CCD) and Complementary Metal-Oxide Semiconductor (CMOS) which are fixed in a rear end of the barrel 6. In this zoom mechanism, both the focus lens 1 and the zoom lens 2 are shifted to fixed or variable distances to provide enlarged or reduced images to the image device 5.

The present invention relates to an improved structure for driving lenses forward and backward in such a zoom mechanism.

Lens Shifting Structure

Figure 6:
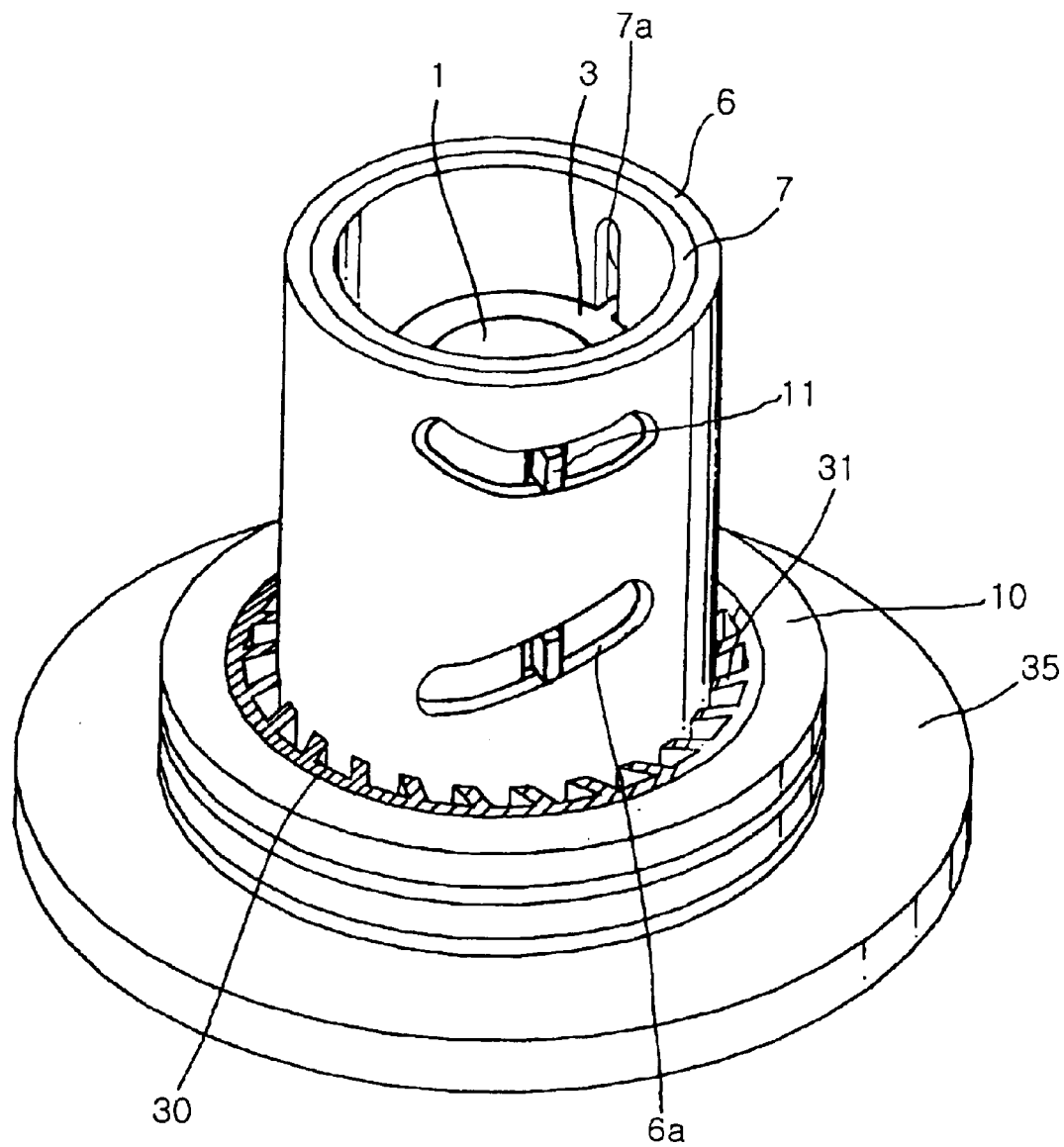
FIG. 6 is a perspective view of a lens driving device of the invention.
Figure 7:
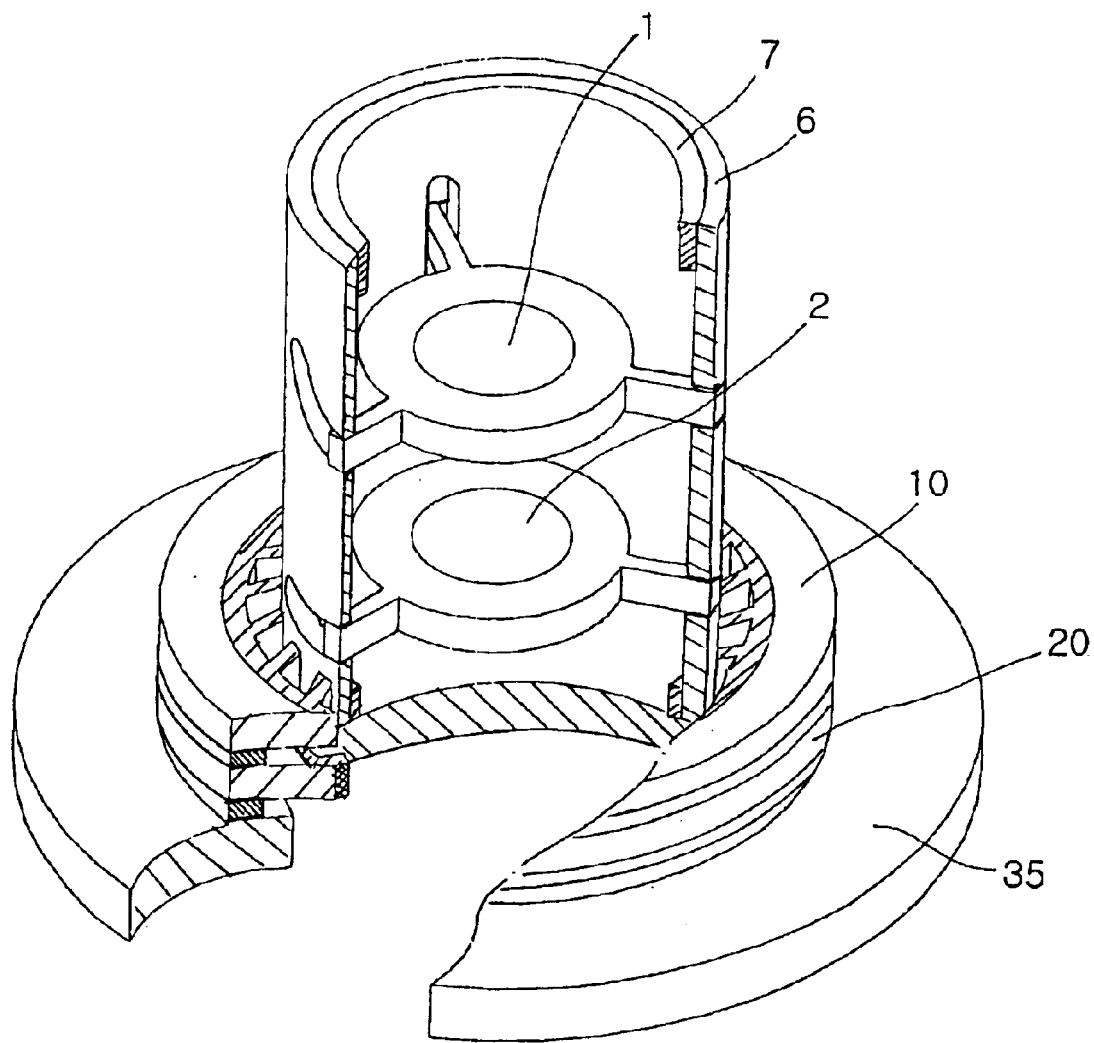
FIG. 7 is a partially broken perspective view of the lens driving device shown in FIG. 6.
Figure 8:
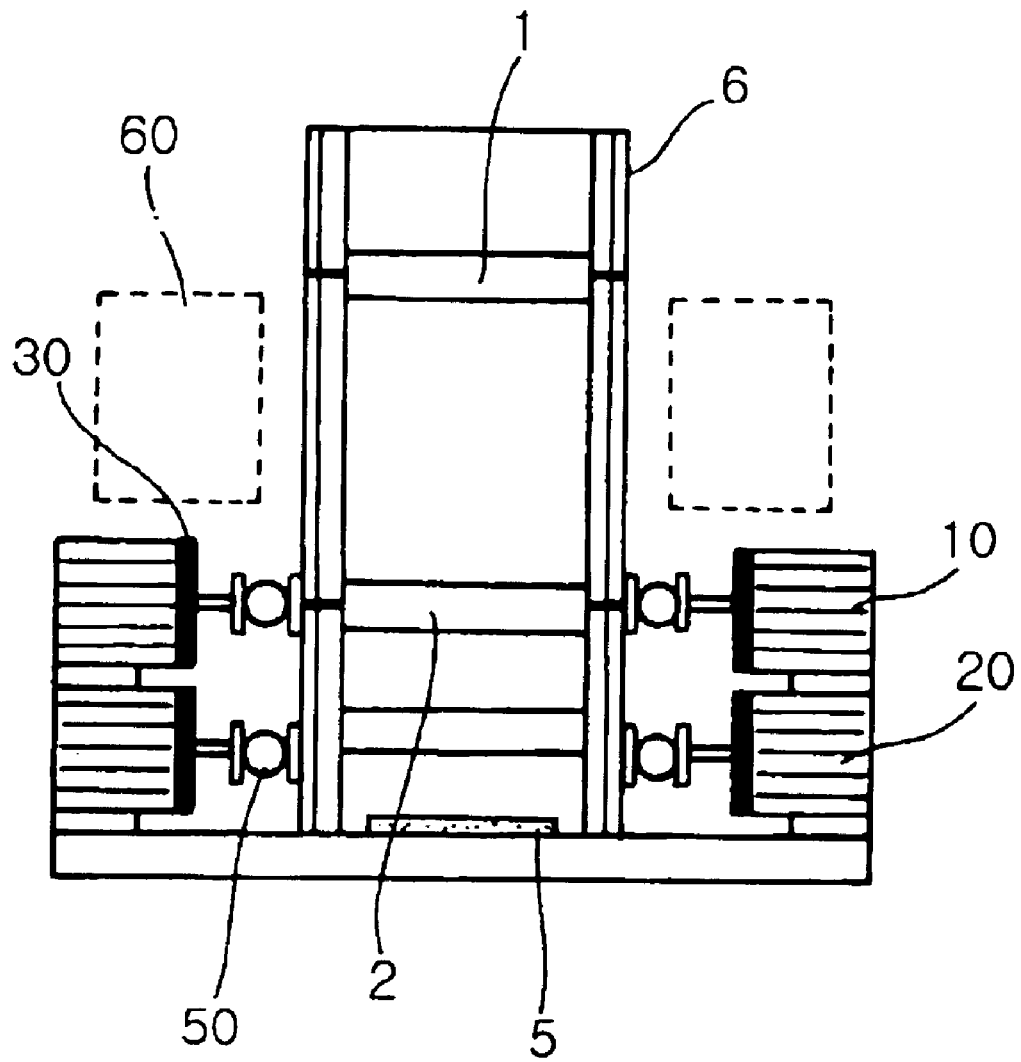
FIG. 8 is a longitudinal sectional view of the lens driving device shown in FIG. 6.
Figure 9:
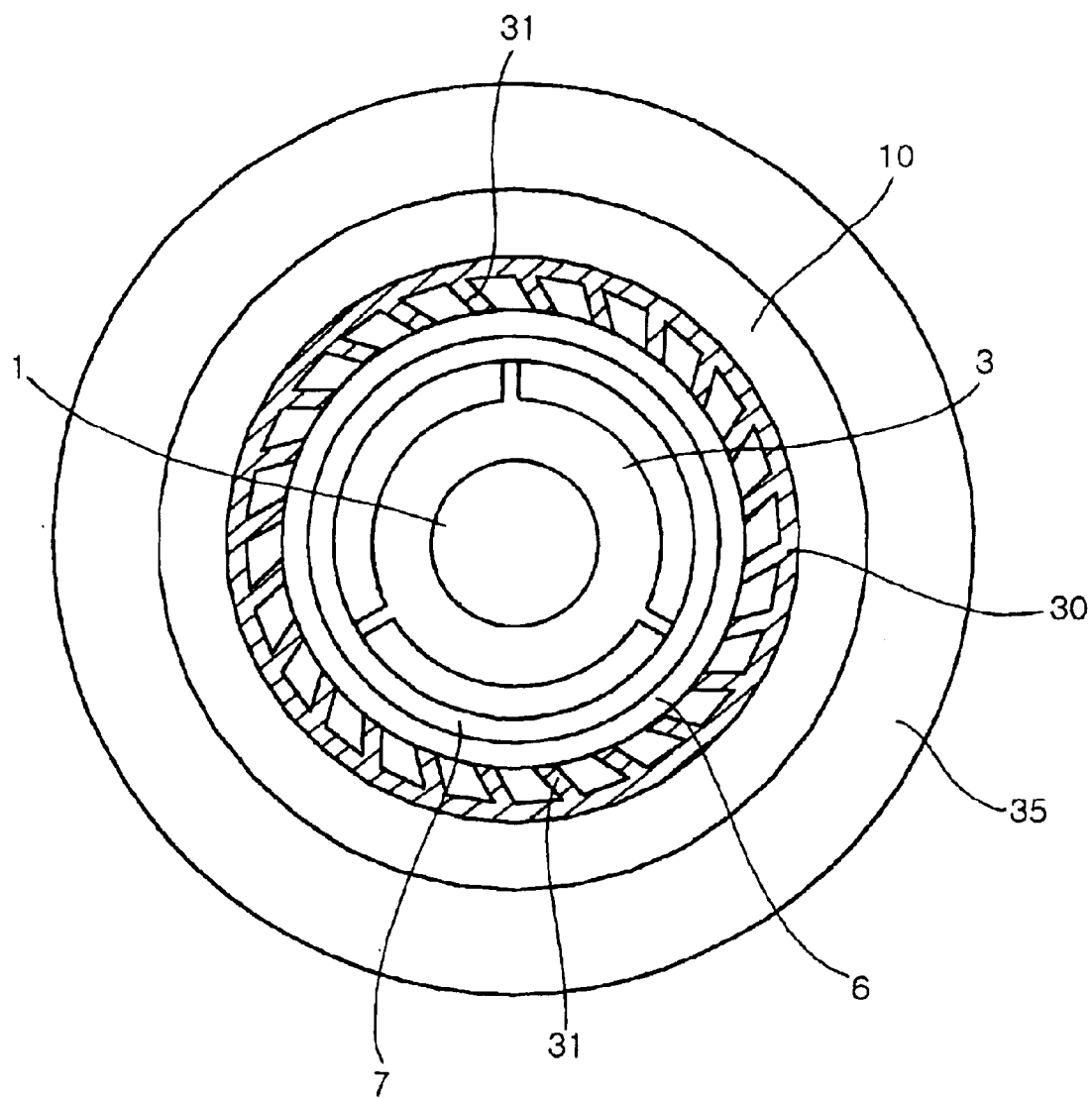
FIG. 9 is a plan view of the lens driving device shown in FIG. 6.
Figure 10:
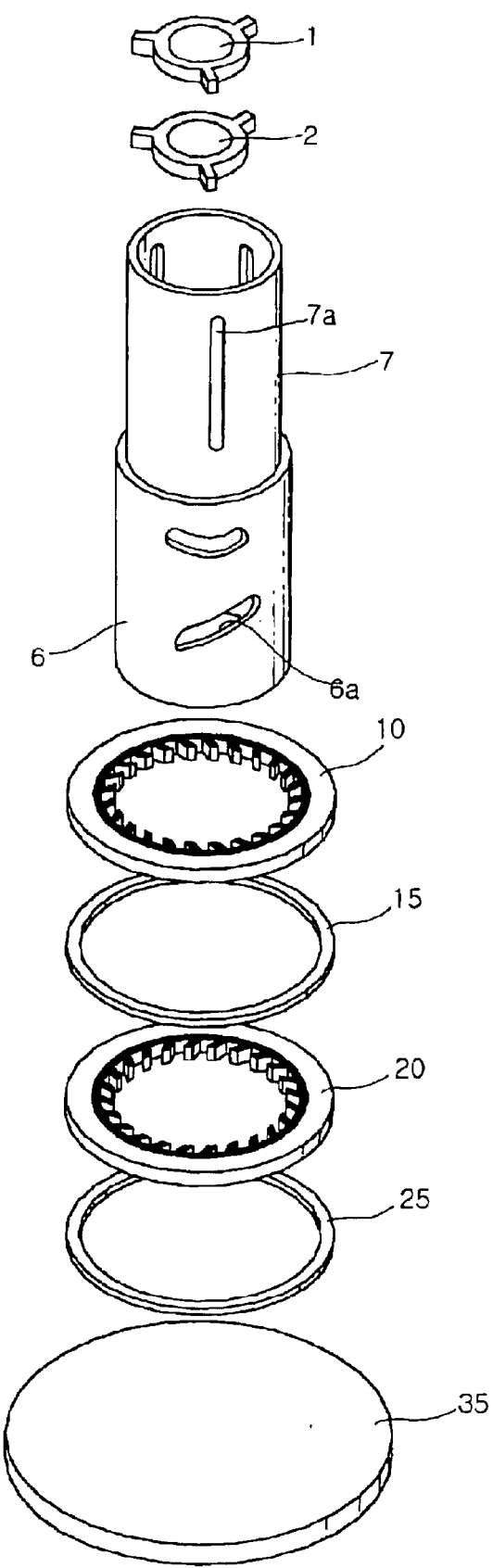
FIG. 10 is an exploded perspective view of the lens driving device shown in FIG. 6.

FIG. 6 is a perspective view of a lens driving device of the invention, FIG. 7 is a partially broken perspective view of the lens driving device shown in FIG. 6, FIG. 8 is a longitudinal sectional view of the lens driving device shown in FIG. 6, FIG. 9 is a plan view of the lens driving device shown in FIG. 6, and FIG. 10 is an exploded perspective view of the lens driving device shown in FIG. 6.

In FIGS. 6 through 10, a focus lens 1 and a zoom lens 2 are movably arranged within barrels 6 and 7. Both the lenses may be so formed that their own portions are projected outward to form bosses 11. Alternatively, the bosses 11 may be in the form of pins driven respectively into the lenses. The lens driving device may further comprise lens frames 3 into which the lenses 1 and 2 are inserted respectively. The lens frames 3 also have integral bosses 11 which are projected outwardly therefrom. Alternatively, the bosses 11 may be in the form of pins inserted respectively into the frames 3.

The lenses having the bosses as above are contained within the cylindrical barrels. In the barrels 6 and 7, the stationary barrel 7 is surrounded by the rotary barrel 6. The stationary barrel 7 is fixedly mounted on a body or base 35 of an optical device, and has elongate guide slots 7a formed along a reciprocating direction of the lenses in a body of the barrel 7. The guide slots 7a receive the bosses 11 of the lenses 1 and 2 so that the lenses 11 and 2 can be moved forward and backward along the guide slots 7a.

The rotary barrel 6 is disposed outside (or inside) the stationary barrel 7, and mounted rotatably on the body or base 35 of the optical device. The rotary barrel 6 has cam-shaped curved guide slots 6a for shifting the lenses 1 and 2 to predetermined positions. The guide slots 6a also receive the bosses 11 of the lenses 1 and 2 to pull/push the lens bosses 11 so that the lenses 1 and 2 are moved forward and backward along the guide slots 7a of the stationary barrel 7.

While the stationary barrel 7 is typically arranged inside the rotary barrel 6, the rotary barrel 6 may be arranged outside the stationary barrel 7 on the contrary.

Piezoelectric Actuator

The lens driving device of the invention utilizes a piezoelectric actuator made of a piezoelectric device. The piezoelectric device comprises composite oxide material such as PZT which is the most representative piezoelectric material. The term PZT is taken from initials of Pb, Zr and Ti. Pressed piezoelectric material instantaneously generates current, and on the contrary, becomes distorted when applied with current.

Such effect is called as Piezoelectric Effect. That is, a negative or positive charge is produced between surfaces of a crystalline solid when a mechanical stress is applied to the crystalline solid. The charge is proportional to the magnitude of the stress, and changes its polarity when the stress is applied in the opposite direction. When a voltage is applied across certain surfaces of the piezoelectric solid, the piezoelectric solid undergoes a mechanical distortion. The distortion is proportional to the magnitude of the voltage, and changes its direction when the voltage is applied in the opposite direction. Such piezoelectric effect is resulted from electric coupling associated with stress, electric field, electric displacement, polarization and so on, and widely used for embodying a sensor, an electric device, an acoustic device and various kinds of electric circuits.

The piezoelectric actuator of the present invention is based upon such piezoelectric effect. Alternatively, the piezoelectric actuator of the present invention can be devised based upon Electrostrictive Effect. Such electrostrictive effect is a phase of piezoelectric effect which produces distortion in proportion to the square of electric field. Electrostrictive effect is different from piezoelectric effect in that the direction of distortion is not changed according to the direction of electric field. Therefore, where electrodes are mounted on both surfaces of an electrostrictive solid, application of a high voltage to the electrodes to polarize the electrostrictive solid generates permanent residual internal strain therein, which may create electric field-induced deformation even if DC electric field is not successively applied to the electrostrictive solid.

The present invention utilizes ring-shaped piezoelectric actuators which have physical properties of contracting or expanding radially in response to electric signals. The piezoelectric actuators are placed in the outer or inner peripheries of the barrels 6 and 7 to wrap the barrels.

First Embodiment

Figure 11:
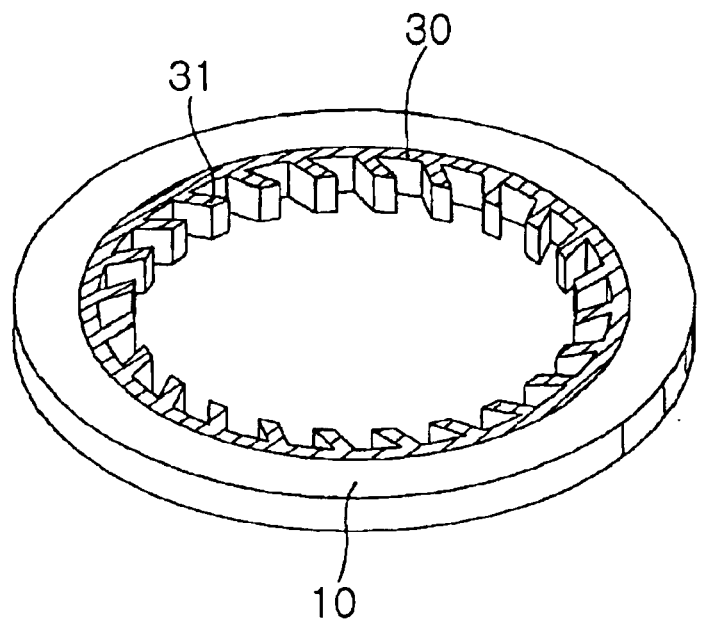
FIG. 11 is a perspective view of a piezoelectric actuator of the lens driving device shown in FIG. 5.

A first embodiment of the lens driving device according to the invention will be described in conjunction with FIGS. 6 through 11. FIG. 11 is a perspective view of a piezoelectric actuator of the lens driving device shown in FIG. 5.

The cylindrical stationary barrel 7 is mounted on the base 35 of the optical device. The focus lens 1 and the zoom lens 2 are movably mounted within the stationary barrel 7. The focus lens 1 and the zoom lens 2 are mounted on the lens frame 3 with bosses 11 projected outward. The barrels 6 and 7 are provided with the linear guide slots 6a and 7a for receiving the bosses 11 so that the lenses 1 and 2 may be shift forward and backward along the guide slots 6a and 7a.

Rotation of the rotary barrel 6 drives the lenses to be moved forward and backward, and piezoelectric actuators 10 and 20 are provided to rotate the rotary barrel 6. The piezoelectric actuators 10 and 20 are arranged in the form of a ring around the rotary barrel 6. FIG. 6 shows the arrangement of the piezoelectric actuators 10 and 20, and FIG. 7 shows the lens driving device which is partially cut away. The piezoelectric actuators 10 and 20 are contracted or expanded radially in response to an input signal from the outside. In this embodiment, the piezoelectric actuators 10 and 20 repeat radial contraction toward the barrel and radial restoration from the same.

Each of the piezoelectric actuators 10 and 20 is mounted with a drive member 30 having a plurality of segments 31 which are projected toward the barrel 6 to contact the same. The drive member 30 is in the form of a ring to contact the inner periphery of the each piezoelectric actuator 10 or 20. The drive member 30 repeats contraction and restoration in response to radial contraction of the each piezoelectric actuator 10 or 20. The drive member 30 is made of elastic metal such as Ti, stainless steel and brass.

The segments 31 formed in the drive member 30 are shaped as comb teeth and projected toward the barrel 6. As shown in FIGS. 6 and 7, the segments 31 are oriented or inclined in a direction for rotating the barrel 6. The segments 31 are arranged substantially adjoining the barrel 6 so that the segments are in contact with the barrel when the drive member 30 is contracted or even when the drive member is not contracted.

Figure 16A:
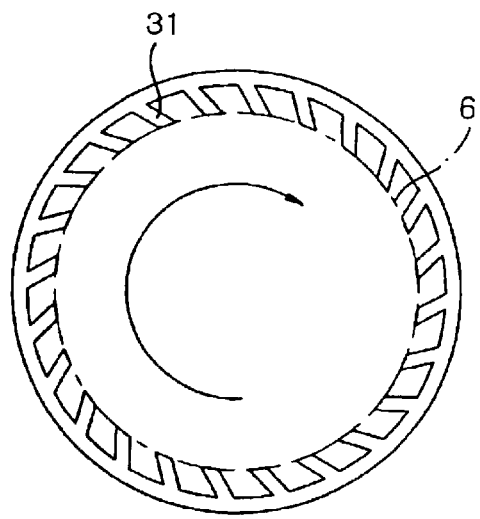
FIGS. 16a through 16d illustrate various configurations of drive member segments of the invention.
Figure 16B:
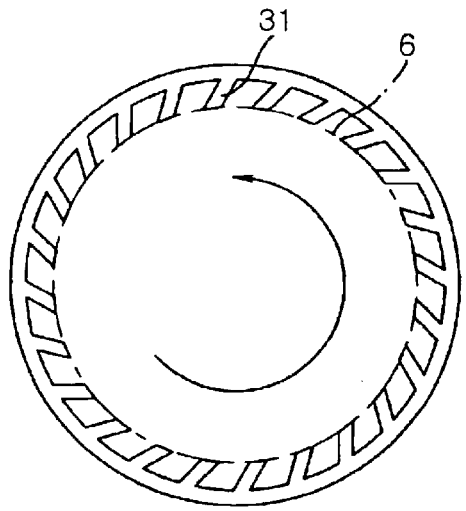
Figure 16C:
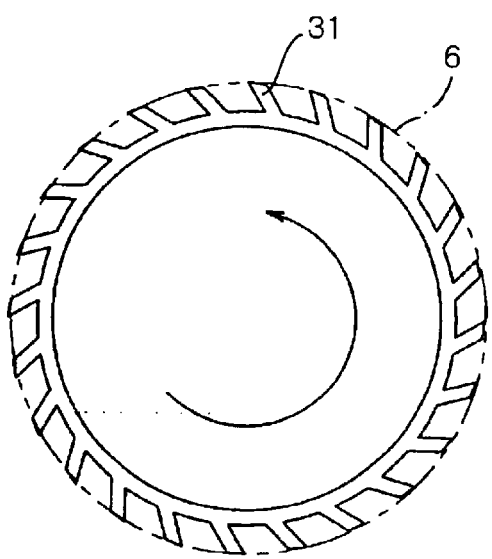
Figure 16D:
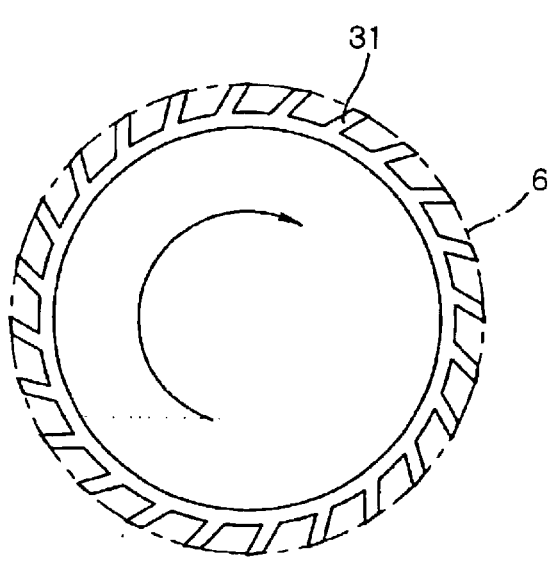

It will defined that the segments 31 are inclined counterclockwise in FIG. 9, and the clockwise direction will be defined as counter to the direction in FIG. 9. In FIGS. 16*a* through *d*, FIG. 16*b* shows segments 31 which are oriented counterclockwise as in FIG. 9, in which a barrel 6 inside the segments 31 is rotated counterclockwise. On the contrary, segments 31 are oriented clockwise in FIG. 16*a*, and a barrel 6 inside the segment 31 is rotated clockwise. In FIG. 16*c*, segments 31 are oriented outward and counterclockwise, and a barrel 6 arranged outside the segments 31 is rotated counterclockwise. FIG. 16*d* shows segments 31 oriented outward and clockwise, and a barrel 6 arranged outside the segments 31 is rotated clockwise.

The drive member 30 is contracted in response to contraction of the piezoelectric actuator, pushing the inclined segments 31 outward, so that the segments 31 rotate the rotary barrel 6 along the inclination of the segments 31. Such contraction is repeated for several thousands to tens of thousands per second and controlled so that the rotary barrel can be rotated to a desired level of rotation. FIG. 11 illustrates such a drive member 30 mounted on the piezoelectric device 10.

The piezoelectric actuators 10 and 20 are provided in a pair in order to impart bi-direction rotation to the rotary barrel 6. That is, the first and second piezoelectric actuators 10 and 20 are arranged adjacent to each other, surrounding the barrel 6.

Each of the first and second piezoelectric actuators 10 and 20 is contracted in a radial direction or a direction of the barrel in response to an external input signal in order to rotate the barrel clockwise or counterclockwise according to the configuration of the segments 31 of the drive member 30 mounted inside the each actuator 10 or 20. In FIGS. 6 and 7, the upper first piezoelectric actuator 10 includes the segments 31 which are inclined clockwise to rotate the barrel 6 clockwise. The lower second piezoelectric actuator 20 includes segments 31' which are inclined counterclockwise to rotate the barrel 6 counterclockwise.

While the segments 31 directly contact the barrel to transmit rotation to the same, bearings 50 may be interposed between the segments 31 and the barrel 6. FIGS. 8 and 9 show the bearings 50. The bearings 50 utilize one-way clutch bearings which are so configured to transmit rotation in only one direction but not in a reverse direction. Such bearings may include several known bearing structures. In application of the one-way clutch bearings 50, the segments 31 of the drive members 30 contact the bearings 50, which are mounted on the rotary barrel 6. In FIG. 8, the reference number 5 designates the image device such as a CCD and CMOS.

Application of the bearings facilitates bi-directional rotation of the barrel. That is, the bearing associated with the first piezoelectric actuator 10 transmits rotation in a clockwise or counterclockwise direction counter to that of the bearing associated with the second piezoelectric actuator 20 so that one piezoelectric actuator can rotate the barrel without friction against the segments of the other piezoelectric actuator.

The piezoelectric actuators 10 and 20 each can be of a laminated structure in which a plurality of ring-shaped piezoelectric elements having a predetermined thickness are stacked one atop another to form one piezoelectric actuator. In the piezoelectric actuator, since drive voltage is proportional to the thickness between electrodes of a piezoelectric element, the laminated structure is preferable so that the piezoelectric actuator can be actuated at a low drive voltage.

Alternatively, the piezoelectric actuator may be in the form of a single plate instead of the laminated structure. There are advantages in that this single plate-type piezoelectric actuator can be fabricated easily and processed simply compared to the laminated piezoelectric actuator. However, since the single plate-type piezoelectric actuator is energized at a drive voltage of about 50 to 100V if used in a resonant frequency, an additional transformer is necessary for amplifying supply voltage. Therefore, the single plate-type piezoelectric actuator may preferably require a ring-type piezoelectric transformer. The piezoelectric transformer is arranged over the piezoelectric actuator, outside the barrel, as shown in FIG. 8.

Figure 12:
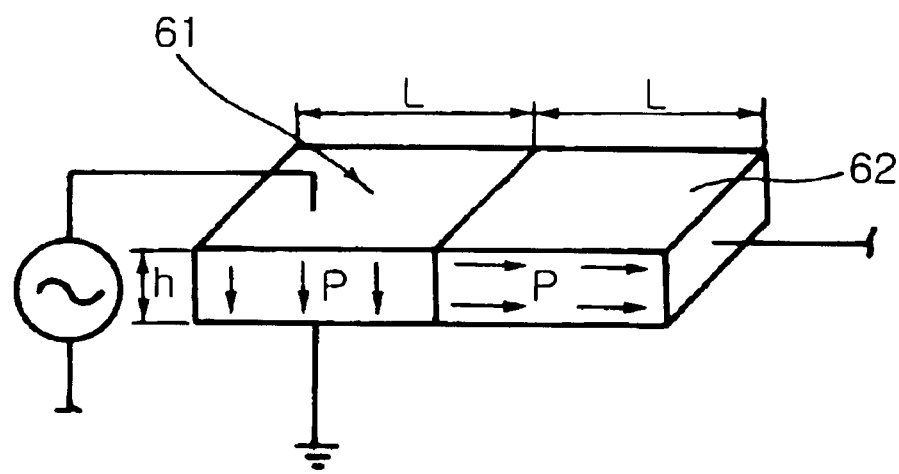
FIG. 12 is a perspective view of a piezoelectric transformer in use for the lens driving device of the invention.

As shown in FIG. 12, the piezoelectric transformer generally comprises an input terminal and a output terminal as an electromagnetic transformer. While the electromagnetic transformer adjusts the ratio of voltage elevation or drop according to the turn ratio between input and output terminals, the piezoelectric transformer adjusts the ratio of voltage elevation or drop according to the configuration variable such as length L, thickness h and polarity orientation P of the transformer. According to the principle of the piezoelectric transformer, application of a voltage to an input terminal 61 generates vibration via negative piezoelectric effect (i.e., an electric signal is translated into mechanical deformation). Resultant vibration in turn generates a mechanical stress to an output terminal 62 so that the output terminal 62 can obtain a desired output voltage elevated or dropped from the input voltage via positive piezoelectric effect (i.e., a mechanical stress is translated into an electric signal).

Again as shown in FIG. 10, an insulator ring 15 is mounted between the first piezoelectric actuator 10 and the second piezoelectric actuator 20, and an insulator ring 25 is also mounted between the second piezoelectric actuator 20 and the base 35.

Second Embodiment

In a second embodiment of the lens driving device according to the invention, a piezoelectric actuator is placed within a barrel unlike the above first embodiment. The second embodiment will be described in conjunction with FIG. 13.

Figure 13:
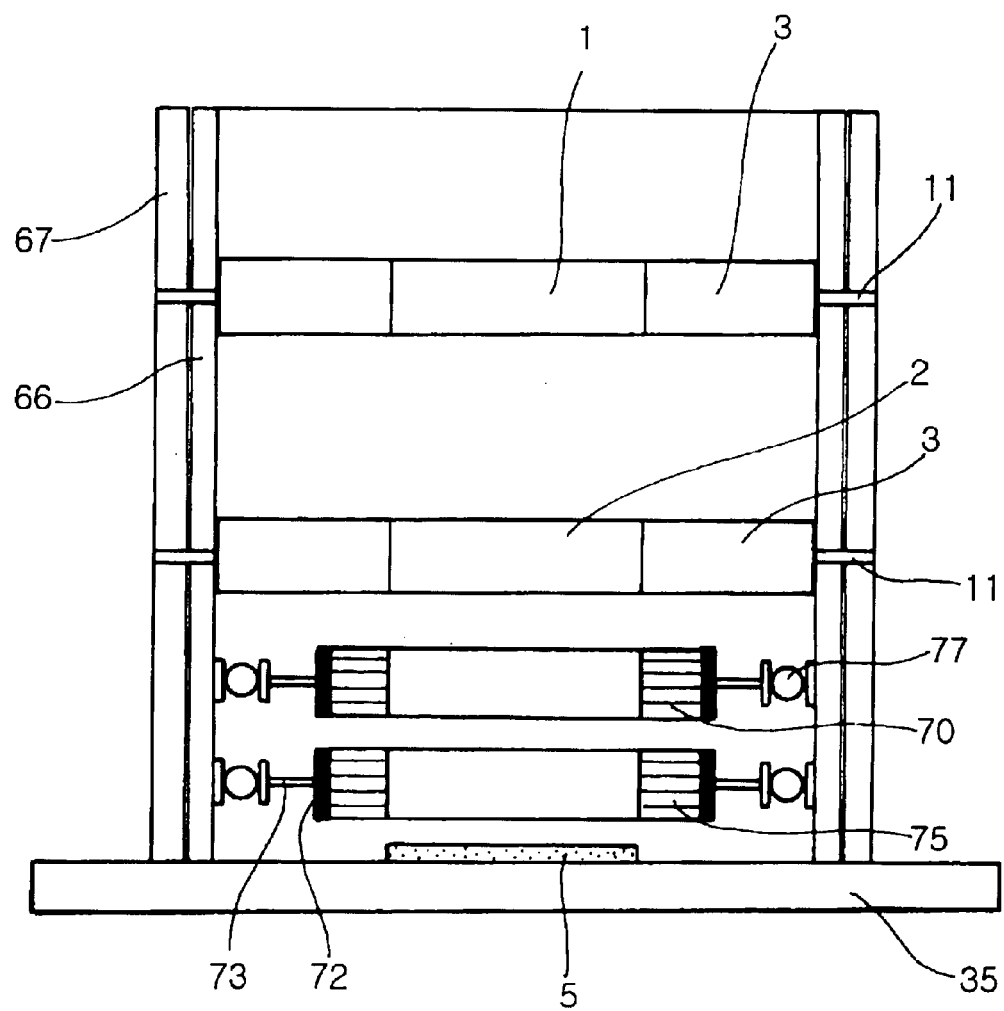
FIG. 13 is a perspective view of a lens driving device according to a second embodiment of the invention.

FIG. 13 illustrates a lens driving device according to a second embodiment of the invention. In FIG. 13, a rotary barrel 66 is rotatably mounted inside the stationary barrel 67 which is fixed onto a base 35. The rotary barrel 66 is provided with a curved guide slot in the form of a cam as in the first embodiment, and the stationary barrel 67 is provided with a linear guide slot for forward and backward movement.

A focus lens 1 and a zoom lens 2 are mounted within the barrels with bosses inserted into the guide slots for allowing the lenses 1 and 2 to be moved forward and backward as in the first embodiment. The lenses 1 and 2 are inserted respectively into lens frames 3. Alternatively, the lens frames 3 can be excluded by forming the bosses directly projected from the lenses.

A pair of piezoelectric actuators 70 and 75 are arranged within the rotary barrel 66. Unlike the first embodiment, the piezoelectric actuators 70 and 75 repeat expansion toward the barrel and restoration from expanded positions. The piezoelectric actuators 70 and 75 are arranged in a pair to impart bi-directional rotation to the rotary barrel 66. Ring-shaped drive members 72 are mounted respectively on the outer peripheries of the piezoelectric actuators 70 and 75.

The ring-shaped drive members 72 each include a plurality of segments which are projected toward the barrel and oriented clockwise or counterclockwise as in the first embodiment. That is, in this embodiment, the segments of the first drive member are oriented counter to those of the second drive member as in the first embodiment.

One-way clutch bearings 77 are installed respectively between the segments 73 and the rotary barrel 66, in which the segments 73 preferably contact the one-way clutch bearings to transmit rotation to the barrel 66.

The second embodiment of the above construction is actuated to rotate the barrel according to the same technique as in the first embodiment. That is, each of the actuators is expanded in response to an external actuation signal or voltage to force the ring-shaped drive member outward. As the drive member is forced outward, the segments integrally formed in the drive member push the bearing to rotate the rotary barrel clockwise or counterclockwise.

Because the second embodiment has the piezoelectric actuators, the drive members and the bearings are placed within the rotary barrel unlike the first embodiment, there are advantages in that a drive mechanism can be reduced in size and an outer mechanism can be omitted. The piezoelectric actuators are ring-shaped so that an external image can be transferred from the lens through internal spaces of the ring-shaped piezoelectric actuators to an image device 5 mounted on the base 35.

The piezoelectric actuators of the second embodiment can be of a laminated structure or a single plate structure. In the case of the single plate-type piezoelectric actuators, piezoelectric transformers are preferably provided.

Third Embodiment

A third embodiment of the invention comprises piezoelectric actuators arranged inside and outside a barrel unlike the above first and second embodiments of the invention. The third embodiment of the invention will be described in conjunction with FIG. 14.

Figure 14:
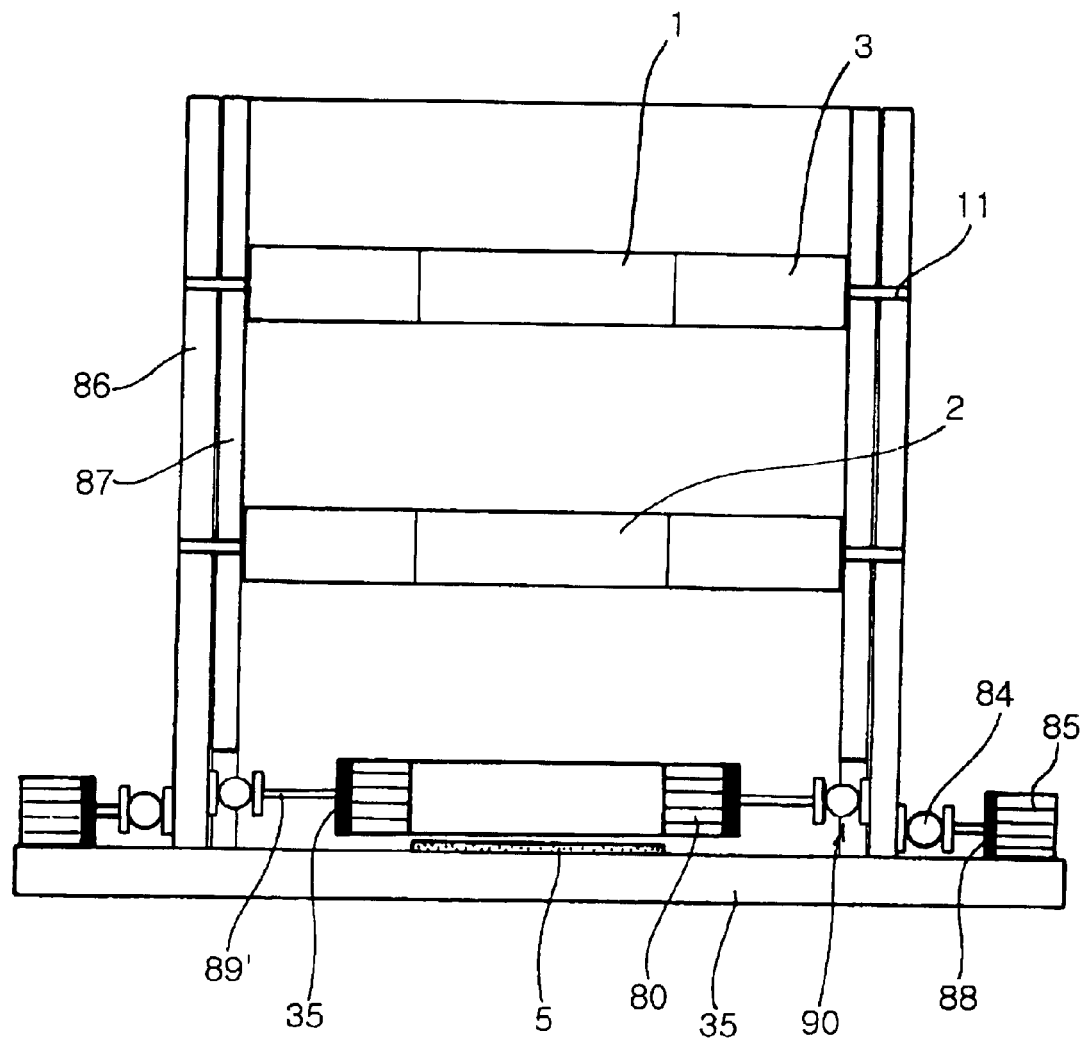
FIG. 14 illustrates a lens driving device according to a third embodiment of the invention.

FIG. 14 illustrates a lens driving device according to the third embodiment of the invention. In FIG. 14, a rotary barrel 86 is mounted rotatably on a stationary barrel 87 which is fixed to a base 35. The rotary barrel 86 is provided with a cam-shaped curved guide slot as in the first embodiment, and the stationary barrel 87 is provided with a linear guide slot for forward and backward movement.

A focus lens 1 and a zoom lens 2 are mounted within the barrel with bosses 11 inserted into the guide slots for allowing the lenses 1 and 2 to be moved forward and backward as in the first embodiment. The lenses 1 and 2 are inserted respectively into lens frames 3. Alternatively, the lens frames 3 can be excluded by forming the bosses directly projected from the lenses.

A pair of piezoelectric actuators 80 and 85 are arranged respectively inside and outside the rotary barrel 86. Unlike the first and second embodiments, the piezoelectric actuators 80 and 85 repeat expansion and contraction toward the barrel and restoration from expanded and contracted positions.

That is, the piezoelectric actuator 85 arranged outside the rotary barrel 86 is contracted toward the barrel 86 upon application of voltage so that segments 89 of a drive member 88 can transmit rotation to the barrel 86.

Figure 15:
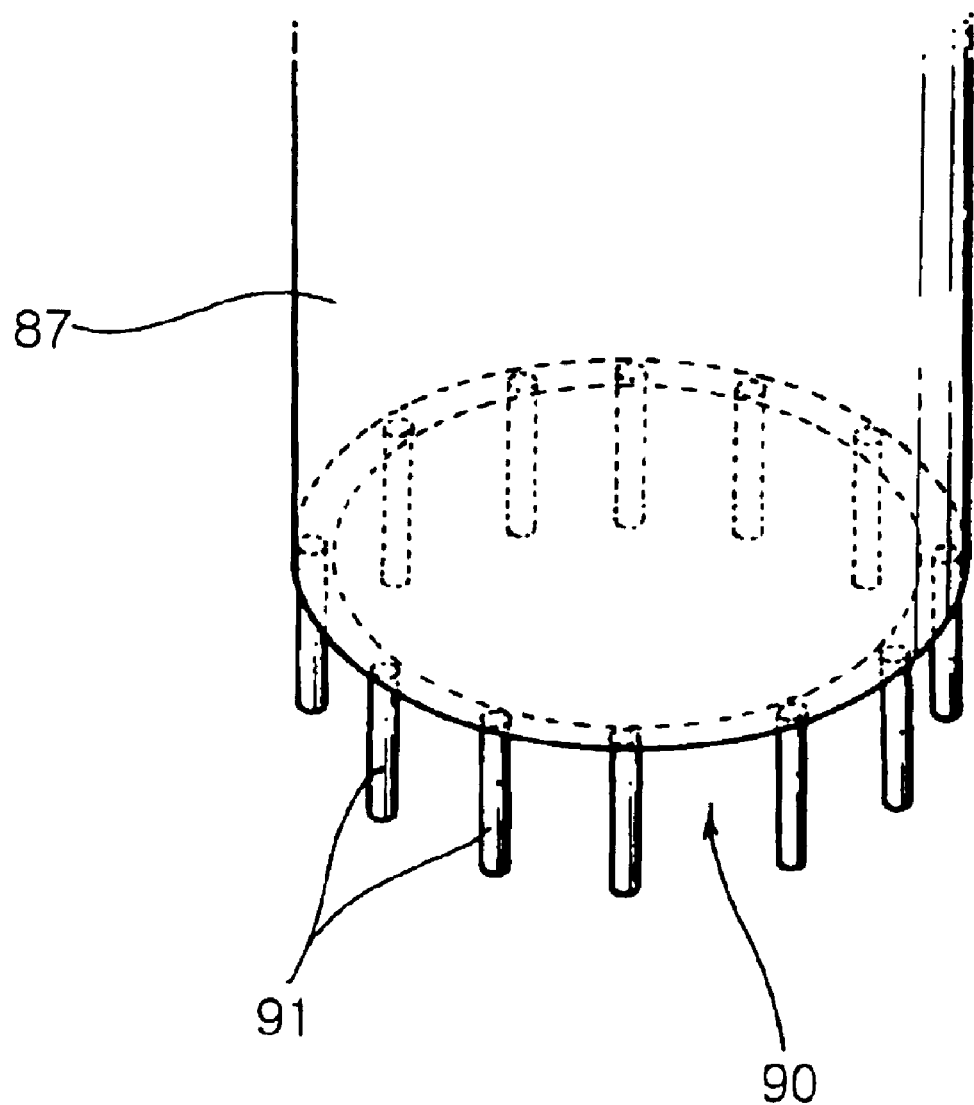
FIG. 15 is a perspective view of a barrel of the lens driving device shown in FIG. 14.

Also, the piezoelectric actuator 80 arranged inside the rotary barrel 86 is expanded outward toward the barrel 86 upon application of voltage to transmit rotation to the barrel 86 via segments 89'. The stationary barrel 87 arranged within the rotary barrel 86 is fixed to the same via posts 91 so that the segments 89' of the piezoelectric actuator 80 do not contact the rotary barrel 86 without interference with the stationary barrel 87. The posts 91 are formed in portions of the stationary barrel 87 so that they do not interfere with movement of the segments. The posts 91 are illustrated specifically in FIG. 15. That is, the posts 91 are arranged alternating with the segments 89' while supporting the stationary barrel 87 so as to ensure sufficient spaces 90 for the segments 89' to move in contact with the rotary barrel 86 according to expansion of the piezoelectric actuator. While this structure is disclosed for illustrative purposes, the lens driving device of the invention can adopt any structures for enabling the internal piezoelectric actuator 80 to contact the rotary barrel.

The piezoelectric actuators 80 and 85 are arranged in a pair to impart bi-directional rotation to the rotary barrel 86. Ring-shaped drive members 88 are mounted respectively on the inner and outer peripheries of the piezoelectric actuators 80 and 85. The ring-shaped drive members 72 include the segments 89, 89' which are projected respectively toward the barrel and oriented clockwise or counterclockwise as in the first embodiment. The configuration of the segments is determined through combination of FIGS. 16b and 16d or FIGS. 16a and 16c.

One-way clutch bearings 84 are installed respectively between the segments 89 and 89' and the rotary barrel 86, in which the segments 89 and 89' preferably contact the one-way clutch bearings 84 to transmit rotation to the barrel 66.

The third embodiment of the above construction is actuated to rotate the barrel according to the same technique as in the first and second embodiments. That is, each of the actuators is contracted or expanded in response to an external actuation signal or voltage to force the outside or inside ring-shaped drive member inward or outward. As the drive member is forced, the segments integrally formed in the drive member push the bearing thereby to rotate the rotary barrel clockwise or counterclockwise.

The third embodiment has the piezoelectric actuators, the drive members and the bearings are placed inside and outside the rotary barrel unlike the first and second embodiments. As a result, there are advantages in that a drive mechanism can be reduced in thickness and thus in size also. The piezoelectric actuators are ring-shaped so that an external image can be transferred from the lens through internal spaces of the ring-shaped piezoelectric actuators to an image device 5 mounted on the base 35. The piezoelectric actuators of the third embodiment can be of a laminated structure or a single plate structure. In the case of the single plate-type piezoelectric actuators, piezoelectric transformers are preferably provided.

The afore-described lens driving device of the invention utilizes the direct drive mechanism based upon the piezoelectric device known as an intelligent device to simplify the rotary structure of the barrel, reduce the size and obtain high power transmission efficiency.

Figure 1:
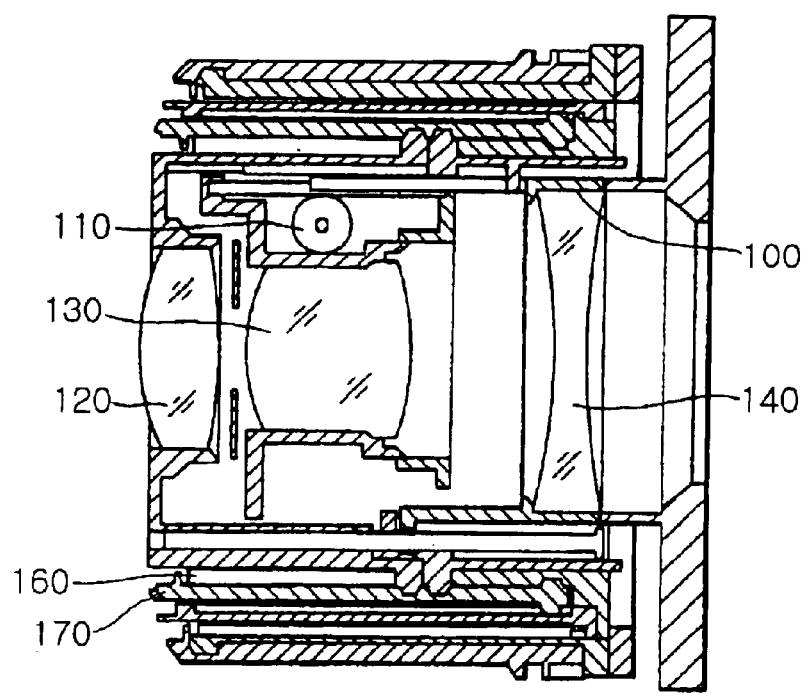
FIG. 1 is a sectional view of a lens driving device of the prior art.
Figure 2:
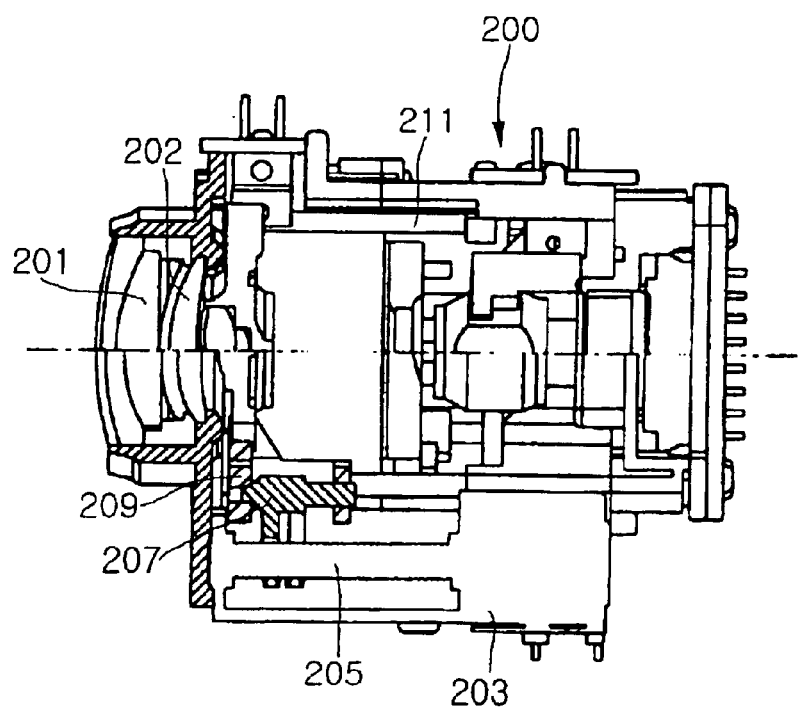
FIG. 2 is a sectional view of another lens driving device of the prior art.
Figure 3:
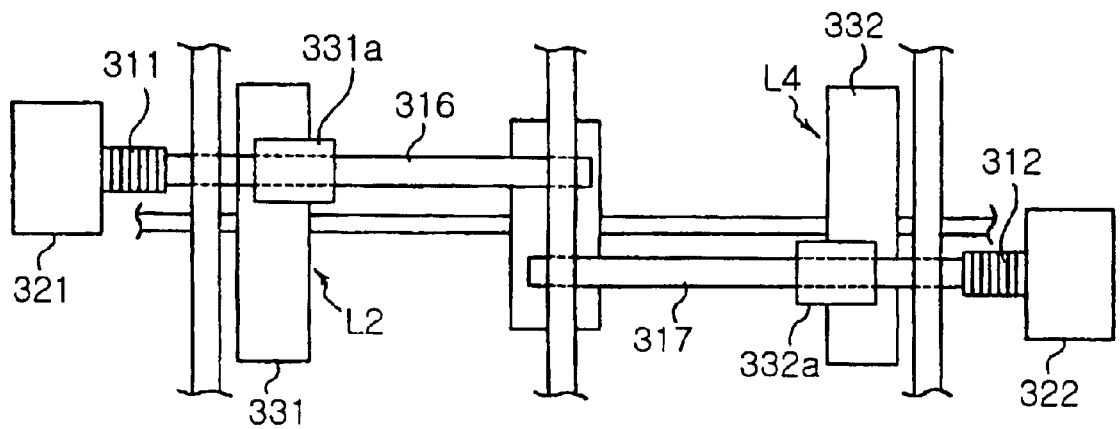
FIG. 3 is a sectional view of a further another lens driving device of the prior art.
Figure 4:
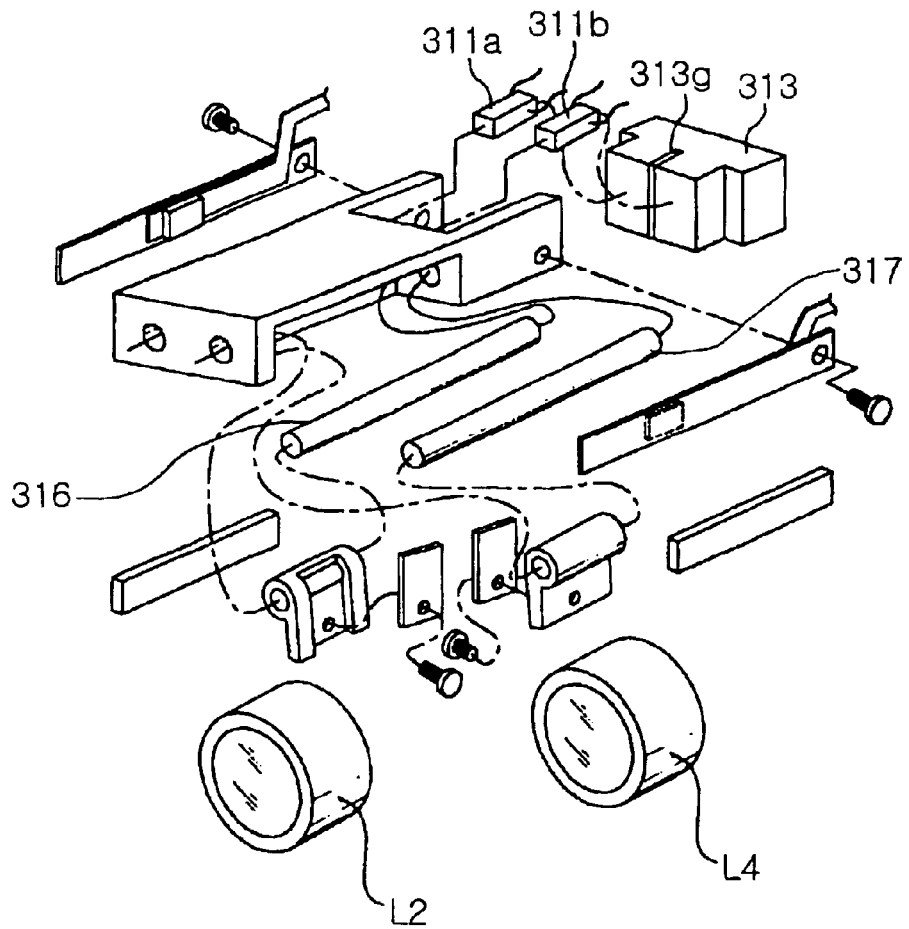
FIG. 4 is an exploded view of the lens driving device shown in FIG. 3.

The lens driving device of the invention also utilizes the piezoelectric actuators and thus can advantageously use AC voltage as it is supplied. That is, the conventional lens driving device using the piezoelectric actuators as shown in FIGS. 3 and 4 must generate voltage having a unit waveform or a waveform of radically different gradients in order to move the lens. However, the invention can advantageously drive the lens with typical AC voltage since the piezoelectric actuator mechanism of the invention shifts the lens without rapid contraction and/or expansion.

Further, the lens driving device of the invention can be developed into various forms of driving devices for ultra small zoom units in use for a camera, a camcorder, an observation camera and a Micro Air Vehicle (MAV).

Further, the lens driving device of the invention provides a novel structure capable of adjusting the feed length of the lens without restraints from other components as well as ensuring precision focusing, precision magnification control and high resolution to the optical device through high precision control of the lens.

Moreover, the lens driving device of the invention excludes use of an electromagnetic motor to prevent generation of electromagnetic waves and thus can be mounted on a mobile instrument such as a mobile terminal.

While this invention has been described in connection with the preferred embodiments in the specification of the invention, it is also understood that various modifications and variations can be made without departing from the scope of the invention, which is not restricted to the above described embodiments but shall be defined by the appended claims and equivalents thereof.

What is claimed is:

1. A lens driving device comprising:
    a barrel unit having an internal space for containing a lens therein and a guide slot for allowing forward and backward movement of the lens through rotation of the barrel unit;
    a ring-shaped piezoelectric actuator unit arranged adjacent to the barrel unit for being contracted or expanded radially in response to an external input signal; and
    a drive member mounted on the piezoelectric actuator unit and having a plurality of segments projected toward the barrel unit to contact the same.

2. The lens driving device as set forth in claim 1, wherein the barrel unit includes a stationary barrel having a guide slot formed linearly in forward and backward directions and a rotary barrel having a guide slot in the form of a cam curve.

3. The lens driving device as set forth in claim 2, wherein the rotary barrel is rotated by the piezoelectric actuator unit.

4. The lens driving device as set forth in claim 3, wherein the piezoelectric actuator unit includes a first piezoelectric actuator for rotating the rotary barrel clockwise and a second piezoelectric actuator for rotating the rotary barrel counter-clockwise.

5. The lens driving device as set forth in claim 4, further comprising a one-way clutch mounted on the rotary barrel for transmitting one-way rotation to the rotary barrel, wherein the one-way clutch bearing is contacted by the segments.

6. The lens driving device as set forth in claim 5, wherein the segments of the drive member mounted on the first piezoelectric actuator are oriented clockwise to contact the one-way clutch bearing, and the segments of the drive member mounted on the second piezoelectric actuator are oriented counterclockwise to contact the one-way clutch bearing.

7. The lens driving device as set forth in claim 6, wherein the first and second piezoelectric actuators are placed outside the rotary barrel.

8. The lens driving device as set forth in claim 6, wherein the first and second piezoelectric actuators are placed inside the rotary barrel.

9. The lens driving device as set forth in claim 6, wherein the first piezoelectric actuator is placed outside the rotary barrel, and the second piezoelectric actuator is placed inside the rotary barrel.

10. The lens driving device as set forth in claim 4, wherein the segments of the drive member mounted on the first piezoelectric actuator are oriented clockwise to contact the rotary barrel, and the segments of the drive member mounted on the second piezoelectric actuator are oriented counterclockwise to contact the rotary barrel.

11. The lens driving device as set forth in claim 1, wherein the piezoelectric actuator has a laminated structure.

12. The lens driving device as set forth in claim 1, wherein the piezoelectric actuator has a single plate structure.

13. The lens driving device as set forth in claim 12, further comprising a ring-shaped transformer mounted adjacent to the barrel unit for supplying amplified voltage to the piezoelectric actuator of the single plate structure.

14. The lens driving device as set forth in claim 1, wherein the lens has a boss fixed to an outer peripheral portion of the lens, the boss being inserted into the guide slot of the barrel unit to movably place the lens within the barrel unit.

15. A lens driving device comprising:
    a stationary barrel having an internal space for containing a lens and a linear guide slot formed in forward and backward directions for allowing forward and backward movement of the lens;
    a rotary barrel arranged surrounding the stationary barrel and having a cam-shaped guide slot;
    a pair of ring-shaped piezoelectric actuators arranged surrounding an outer peripheral portion of the rotary barrel for contracting and expanding radially in response to an external input signal;
    a pair of one-way clutch bearings mounted on the outer peripheral portion of the rotary barrel for transmitting rotation in one direction; and
    a pair of ring-shaped drive members mounted respectively on inner peripheral portions of the piezoelectric actuators, the drive members having clockwise segments and counterclockwise segments projected inward to contact the one-way clutch bearings.

16. The lens driving device as set forth in claim 15, wherein the piezoelectric actuators have a laminated structure.

17. The lens driving device as set forth in claim 15, wherein the piezoelectric actuators have a single plate structure.

18. The lens driving device as set forth in claim 17, further comprising a ring-shaped transformer mounted adjacent to the barrel unit for supplying amplified voltage to the piezoelectric actuators of the single plate structure.

19. The lens driving device as set forth in claim 15, wherein the lens has a boss fixed to an outer peripheral portion of the lens, the boss being inserted into the guide slots of the barrels to movably place the lens within the barrels.

20. The lens driving device as set forth in claim 15, further comprising a lens frame having a boss projected from an outer peripheral portion of the lens frame, wherein the boss being inserted into the guide slots of the barrels to movably place the lens within the barrels.

21. A lens driving device comprising:
    a stationary barrel having an internal space for containing a lens and a linear guide slot formed in forward and backward directions for allowing forward and backward movement of the lens;
    a rotary barrel arranged surrounding the stationary barrel and having a cam-shaped guide slot;
    a pair of ring-shaped piezoelectric actuators arranged within the rotary barrel for expanding and contracting radially in response to an external input signal;

a pair of one-way clutch bearings mounted on an inner peripheral portion of the rotary barrel for transmitting rotation in one direction; and a pair of ring-shaped drive members mounted respectively on outer peripheral portions of the piezoelectric actuators, the drive members having clockwise segments and counterclockwise segments projected inward to contact the one-way clutch bearings.

22. The lens driving device as set forth in claim 21, wherein the piezoelectric actuators have a laminated structure.

23. The lens driving device as set forth in claim 21, wherein the piezoelectric actuators have a single plate structure.

24. The lens driving device as set forth in claim 23, further comprising a ring-shaped transformer mounted adjacent to the barrel unit for supplying amplified voltage to the piezoelectric actuators of the single plate structure.

25. The lens driving device as set forth in claim 21, wherein the lens has a boss fixed to an outer peripheral portion of the lens, the boss being inserted into the guide slots of the barrels to movably place the lens within the barrels.

26. The lens driving device as set forth in claim 21, further comprising a lens frame having a boss projected from an outer peripheral portion of the lens frame, wherein the boss being inserted into the guide slots of the barrels to movably place the lens within the barrels.

27. A lens driving device comprising:

a stationary barrel having an internal space for containing a lens and a linear guide slot formed in forward and backward directions for allowing forward and backward movement of the lens;

a rotary barrel arranged surrounding the stationary barrel and having a cam-shaped guide slot;

a ring-shaped piezoelectric actuator arranged within the rotary barrel for expanding radially and restoring to an original position in response to an external input signal;

a ring-shaped piezoelectric actuator arranged surrounding an outer peripheral portion of the rotary barrel for contracting radially and restoring to an original position in response to an external input signal;

a pair of one-way clutch bearings mounted on outer and inner peripheral portions of the rotary barrel for transmitting rotation in one direction; and a pair of ring-shaped drive members mounted respectively on outer peripheral portions of the piezoelectric actuators, the drive members having clockwise segments and counterclockwise segments projected inward to contact the one-way clutch bearings.

28. The lens driving device as set forth in claim 27, wherein the piezoelectric actuators have a laminated structure.

29. The lens driving device as set forth in claim 27, wherein the piezoelectric actuators have a single plate structure.

30. The lens driving device as set forth in claim 29, further comprising a ring-shaped transformer mounted adjacent to the barrel unit for supplying amplified voltage to the piezoelectric actuators of the single plate structure.

31. The lens driving device as set forth in claim 27, wherein the lens has a boss fixed to an outer peripheral portion of the lens, the boss being inserted into the guide slots of the barrels to movably place the lens within the barrels.

32. The lens driving device as set forth in claim 27, further comprising a lens frame having a boss projected from an outer peripheral portion of the lens frame, wherein the boss being inserted into the guide slots of the barrels to movably place the lens within the barrels.

* * * * *